(12) United States Patent
Tyrrell

(10) Patent No.: US 11,690,381 B2
(45) Date of Patent: Jul. 4, 2023

(54) POULTRY HANDLING AND KILLING APPARATUS

(71) Applicant: Jonathan Charles Coenraad Tyrrell, Sherwood Park (CA)

(72) Inventor: Jonathan Charles Coenraad Tyrrell, Sherwood Park (CA)

(*) Notice: Subject to any disclaimer, the term of this patent is extended or adjusted under 35 U.S.C. 154(b) by 0 days.

(21) Appl. No.: 17/356,439

(22) Filed: Jun. 23, 2021

(65) Prior Publication Data

US 2022/0408739 A1  Dec. 29, 2022
US 2023/0408739 A1  Dec. 29, 2022

(51) Int. Cl.
*A22B 3/10* (2006.01)
*A22B 5/00* (2006.01)

(52) U.S. Cl.
CPC . *A22B 3/10* (2013.01); *A22B 5/00* (2013.01)

(58) Field of Classification Search
CPC ................................. A22B 3/10; A22B 5/00
USPC ................................... 452/53, 54, 102, 103
See application file for complete search history.

(56) References Cited

U.S. PATENT DOCUMENTS

| | | | | |
|---|---|---|---|---|
| 6,001,011 A | * | 12/1999 | Johnson | A22B 3/083 452/65 |
| 6,899,613 B2 | * | 5/2005 | van den Nieuwelaar | A22C 21/0015 452/65 |
| 8,932,117 B1 | * | 1/2015 | Keck | A22B 3/086 452/54 |

* cited by examiner

*Primary Examiner* — Richard T Price, Jr.
(74) *Attorney, Agent, or Firm* — Capehart Law Firm

(57) ABSTRACT

An apparatus including a main body, a grabber assembly, and a killing assembly. The grabber assembly includes a grabber head sized to hold a leg and/or neck of poultry. The killing assembly includes a housing removably attached to the main body, a blade removably located within the housing, a rod, at least one tensioning device for placing the rod under tension, a holder device for holding the rod under tension and a killing-trigger for releasing the holder means. Once released, the rod is forcefully sprung in a forward direction, moving the blade over the grabber head thereby decapitating the poultry being grasped at the neck by the grabber head. The apparatus aids a user in handling poultry and quickly, easily, and humanely decapitating poultry.

20 Claims, 10 Drawing Sheets

POULTRY HANDLING AND KILLING APPARATUS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of poultry handling of existing art and more specifically relates to an apparatus for humanely handling and killing poultry.

RELATED ART

Throughout human history, people have most often implemented simple techniques and tools (for example, axes, knives, sticks/rods, etc.) to dispatch birds. Many of these techniques and tools are still used today. The individual performing the handling or culling of the bird typically has direct physical contact with the desired tool and intended bird, and as such, they are at an increased risk of injuring themself or the animal. This consequently increases the margin for error and increases the likelihood of not performing the culling of the animal correctly. This issue is exacerbated when the operator is dealing with aggressive animals, animals spread over a large area or a large number of animals.

Further, more and more people in today's cultural environment are adopting a more 'earthly' and wholistic approach to living with nature and producing their own food sources. Many people who are interested in "farm-to-table" food production are inexperienced or uncomfortable with the concept of culling animals for their meat. As such, this can lead to practices that are dangerous for the operator and cause injury and/or distress to the animal. Thus, a suitable solution is desired.

SUMMARY OF THE INVENTION

In view of the foregoing disadvantages inherent in the known poultry handling art, the present disclosure provides a novel poultry handling and killing apparatus. The general purpose of the present disclosure, which will be described subsequently in greater detail, is to provide an apparatus used for the selective handling and/or killing of poultry. The apparatus aids a user in quickly, easily, and humanely decapitating poultry.

An apparatus for at least one of grasping and killing poultry is disclosed herein. The apparatus may include a main body, a grabber assembly, and a killing assembly. The main body may include a first body-end opposite a second body-end and an elongated-body length therebetween. The grabber assembly may include a grabber head located at the first body-end of the main body. The grabber head may include at least a first grabber finger and a second grabber finger defining an opening therebetween. The first grabber finger and the second grabber finger may be pivotally connected together such that movement of the first grabber finger and the second grabber finger relative to each other allows for selective movement of the grabber head between an open position and a grasping position. The opening may be smaller in the grasping position than in the open position and the opening may be sized to hold at least one of a leg and a neck of the poultry when in the grasping position. Further, the grabber assembly may include an actuator assembly being configured to move the first grabber finger and the second grabber finger between the open position and the grasping position.

The killing assembly may include a housing attached to a top surface of the main body. The housing may include a first opening opposite a second opening, the first opening being located about the grabber head and defining a blade-exit. A blade may be removably located within the housing and configured for selective movement out of the blade-exit. Further, a rod may be provided and include a first rod-end opposite a second rod-end and a rod-length therebetween. The first rod-end may be attached to a rear-side of the blade and may be configured for selective placement between a loaded position and an unloaded position. At least one tensioning means may be configured to selectively place the rod in tension, biasing the rod in a forward direction and thereby placing the rod in the loaded position.

A holder means may be provided and configured to hold the rod in the loaded position. A killing trigger may be in communication with the holder means. Actuation of the killing-trigger when the rod is in the loaded position may forcefully spring the rod in the forward direction, moving the blade from the blade-exit and over the grabber head, thereby decapitating the poultry being grasped at the neck by the grabber head. A stopper means may be attached to at least one of the first grabber finger and the second grabber finger and may be configured to stop movement of the blade.

According to another embodiment, a method of using an apparatus for killing poultry is also disclosed herein. The method may include providing the apparatus as above; holding the rod in the loaded position via the holder means; placing the grabber head around the neck of the poultry in the open position; actuating the grabber actuator assembly to move the grabber head into the grasping position, thereby grasping the neck of the poultry; and actuating the killing-trigger, thereby forcefully springing the rod in the forward direction and moving the blade from the blade-exit and over the grabber head, thereby decapitating the poultry being grasped at the neck by the grabber head.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a poultry handling and killing apparatus, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to poultry handling and killing and more particularly to a poultry handling and killing apparatus. Generally disclosed is an apparatus specifically designed for the purpose of grasping, handling, restraining and/or killing poultry and other fowl species. The apparatus may be used for killing poultry for meat and/or for culling poultry for other purposes (such as sick or wounded poultry). The apparatus may include a hand operated grabber tool equipped with a blade affixed to a rod which can be placed under tension via high strength durable elastic band(s), allowing an operator to use the apparatus from a safe physical distance from the animal.

Fingers of the grabber tool may include a soft or malleable/conforming material to ensure the poultry is held securely and is not injured or distressed due to the grabber tool. The blade may be released from the apparatus in a quick, controlled, and precise manner, effectively ensuring humane decapitation of the poultry. To ensure complete decapitation, the blade may be designed to be wider than a grabber head of the grabber tool (when in a closed position).

The apparatus may be constructed with high quality and durable materials to ensure functionality and repeated use over a reasonable time period. Further, the apparatus may be simple in construction, lightweight and allow ease of use, maintenance, assembly, disassembly, cleaning, blade sharpening and parts replacement. The apparatus may be provided in many sizes depending on the size of the poultry. Further, the apparatus may incorporate a variety of safety features. For example, the blade may be housed within a housing at all times (until the blade is released for killing). The apparatus may also include a blade stopper means, preventing the blade from escaping from the apparatus.

Referring now more specifically to the drawings by numerals of reference, there is shown in FIGS. 1-9B, various views of an apparatus 100.

Figure 1:
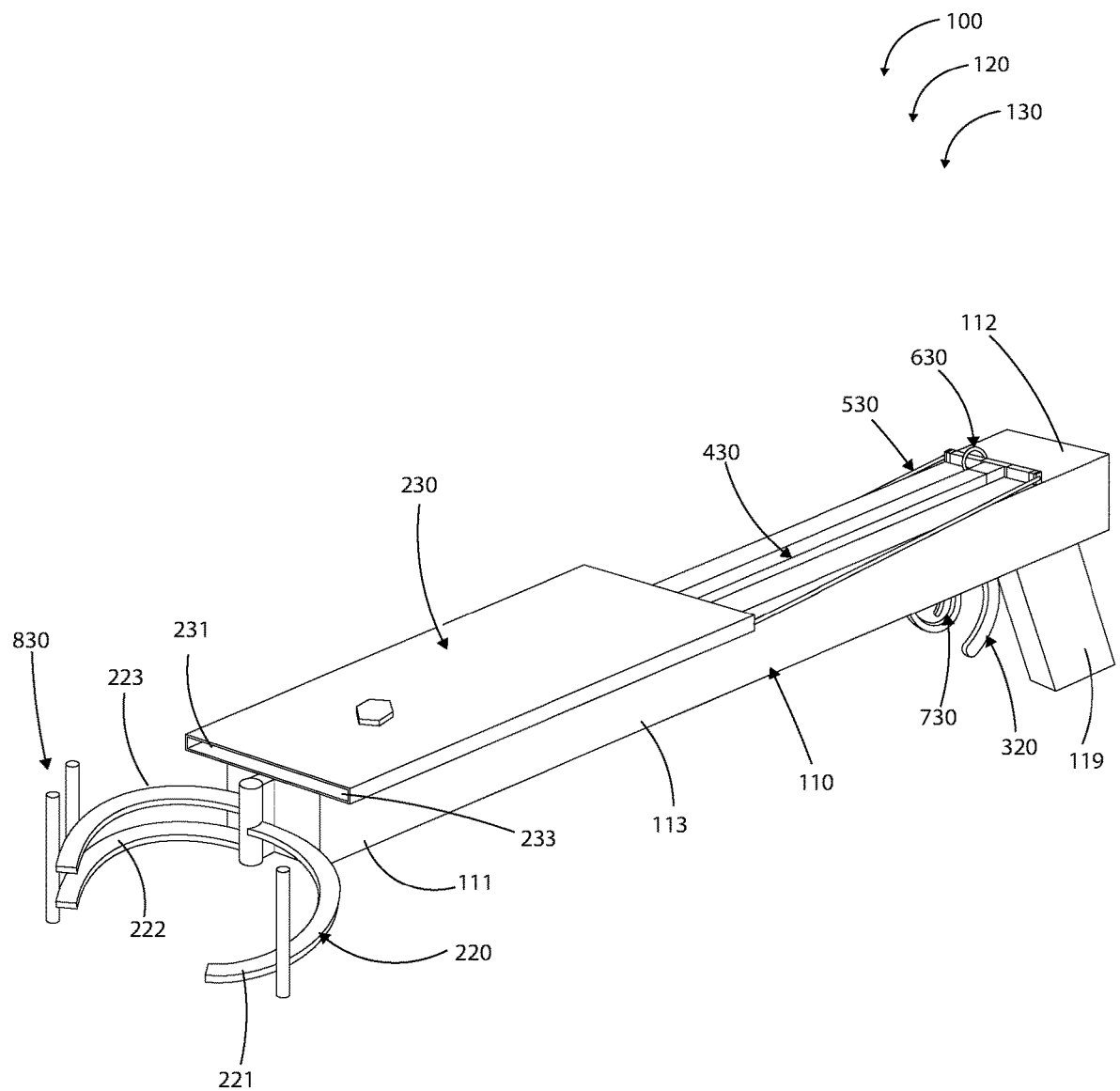
FIG. 1 is a perspective view of an apparatus, according to an embodiment of the disclosure.

FIG. 1 shows a perspective view of the apparatus 100 according to an embodiment of the present disclosure. As illustrated, the apparatus 100 may include a main body 110, a grabber assembly 120 and a killing assembly 130. The apparatus 100 may be used for at least one of grasping and/or killing poultry. For example, in some embodiments, the apparatus 100 may only be used for grasping poultry, for example, by a leg, to catch or move the poultry. In other examples, the apparatus 100 may be used for both grasping and killing poultry. In this example, the poultry may be grasped by a neck of the poultry. The apparatus 100 may quickly and accurately decapitate the poultry (when used for killing) to ensure the killing is achieved as humanely as possible.

As shown in FIG. 1, the main body 110 may include a first body-end 111 opposite a second body-end 112 and an elongated-body length 113 therebetween. In some embodiments, again as shown in FIG. 1, the second body-end 112 may include a handle 119 for allowing a user to easily grip onto for controlling the apparatus. The poultry contemplated for use with the apparatus 100 may range in size. For example, chickens, geese, chicks (infirm), etc. are contemplated for use with the apparatus 100. As such, the apparatus 100 may be available in a variety of sizes to accommodate size/type of poultry. Further, it is contemplated that the apparatus 100 may be lightweight and thus easy to handle for the user. As such, the main body 110 may be made from lightweight materials such as plastic.

Figure 2A:
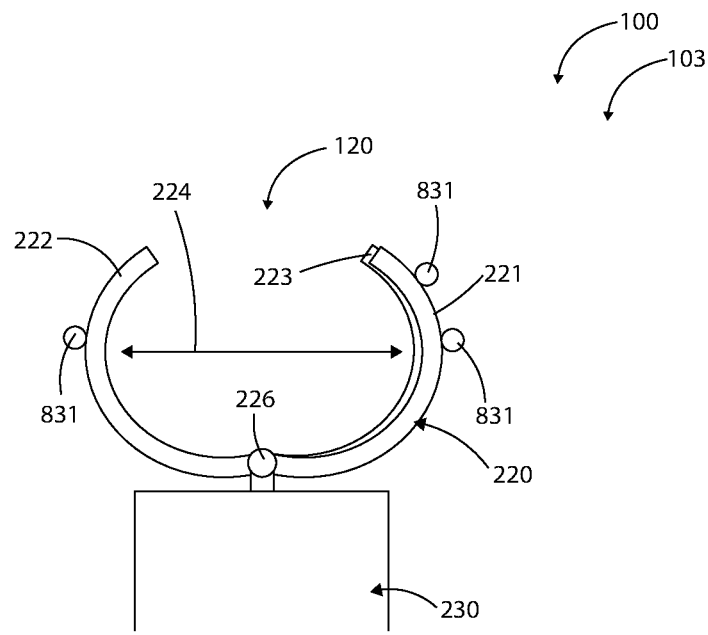
FIG. 2A is a top view of the apparatus, illustrating a grabber head in an open position, according to an embodiment of the present disclosure.
Figure 2B:
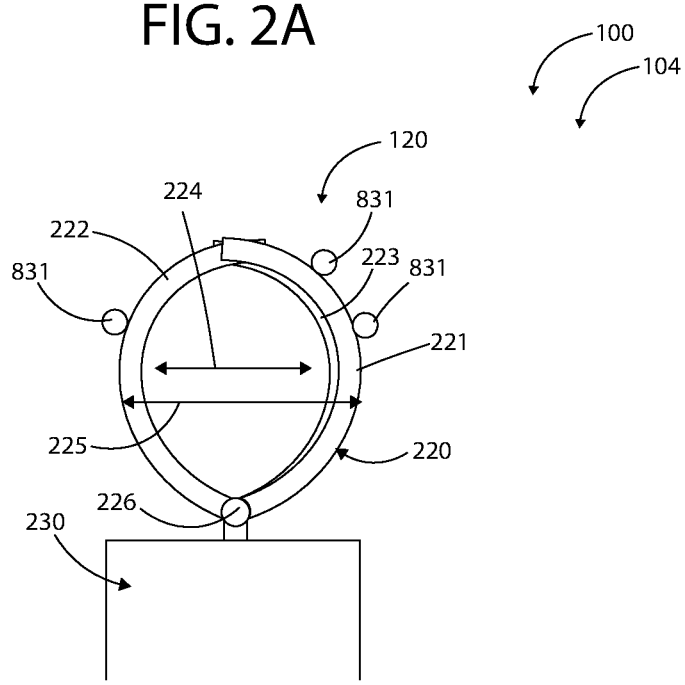
FIG. 2B is a top view of the apparatus, illustrating the grabber head in a grasping position, according to an embodiment of the present disclosure.

As shown in FIGS. 2A-2B, the grabber assembly 120 may include a grabber head 220 located at the first body-end 111 of the main body 110. In some embodiments, the grabber head 220 may include a first grabber finger 221 and a second grabber finger 222 defining an opening 224 therebetween. The first grabber finger 221 and the second grabber finger 222 may be pivotally connected together such that movement of the first grabber finger 221 and the second grabber finger 222 relative to each other allows for selective movement of the grabber head 220 between an open position 103 and a grasping position 104. The opening 224 may be sized to hold at least one of a leg and/or a neck of the poultry when in the grasping position 104. As shown in FIGS. 2A-2B, the opening 224 may be smaller in the grasping position 104 than in the open position 103 (to effectively hold the leg/neck of the poultry.

Preferably, the grabber head 220 may further include a third grabber finger 223. As shown, the first grabber finger 221 may be located about a right side 116 of the main body 110, the third grabber finger 223 may also be located about the right side 116 of the main body 110 and below the first grabber finger 221 (substantially parallel thereto), and the second grabber finger 222 may be located about a left side 115 of the main body. When in the grasping position 104, the first grabber finger 221 and the third grabber finger 223 may 'sandwich' the second grabber finger 222 therein. In some embodiments, the first grabber finger 221, the second grabber finger 222 and the third grabber finger 223 may all be attached to a cylindrical hinge 226 via which the grabber fingers (221, 222, 223) may be configured to pivot relative each other.

Further, in some embodiments, an inner surface of each of the first grabber finger 221, the second grabber finger 222 and the third grabber finger 223 may include a soft material. Further, the soft material may be flexible/malleable. This may provide comfort to the leg or neck of the poultry so they do not get hurt from the grasping of the apparatus. In some embodiments, the soft material may be a rubber or silicone material.

Figure 4:
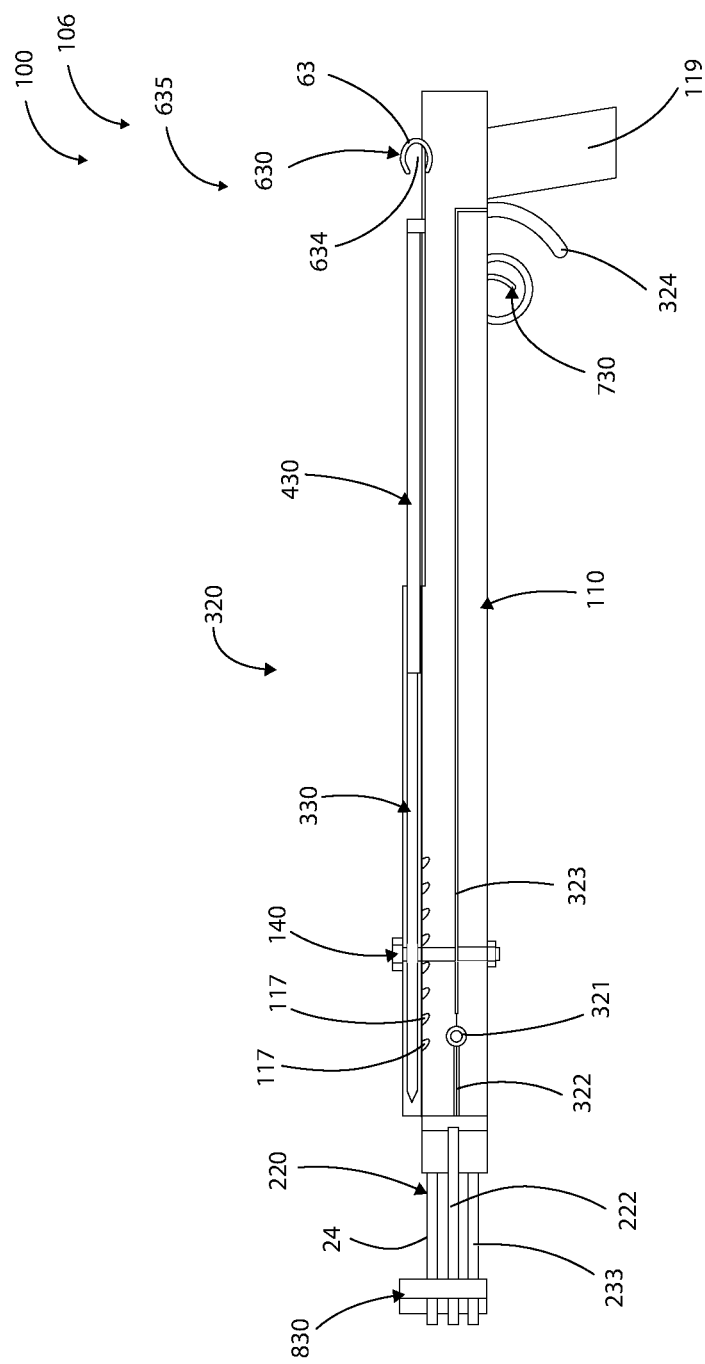
FIG. 4 is a side view of the apparatus, illustrating the apparatus in the unloaded position, according to an embodiment of the present disclosure.

Further, as shown specifically in FIG. 4, the grabber assembly 120 may include an actuator assembly 320. The actuator assembly 320 may be configured to move the first grabber finger 221 and the second grabber finger 222 (and the third grabber finger 223 in some embodiments) between the open position 103 and the grasping position 104. For example, in some embodiments, the actuator assembly 320 may include at least one spring 321 housed within an interior of the main body 110. The at least one spring 321 may be configured to bias the first grabber finger 221 and the second grabber finger 222 (and the third grabber finger 223) in one of the open position 103 and the grasping position 104. Further, in some embodiments a scissor mechanism 322 may be provided within the interior of the main body 110.

A cord 323 may be housed within the interior of the main body 110 and in communication with the at least one spring 321 and a grabber-trigger 324 may be in communication with the cord 323 (for causing the movement of the grabber head 220). For example, the cord 323 may be attached to the at least one spring 321 at one end, span the elongated body-length 113 of the main body 110, and attach to the grabber-trigger 324. As shown, the grabber-trigger 324 may be located on an outer surface of the main body 110. In one example, the grabber head 220 may be biased in the open position 103 and once the grabber-trigger 324 is pressed, the cord 323 is pulled which actuates the scissor mechanism 322, overcoming the bias of the spring 321 and moving the grabber head 220 into the grasping position 104.

Figure 7:
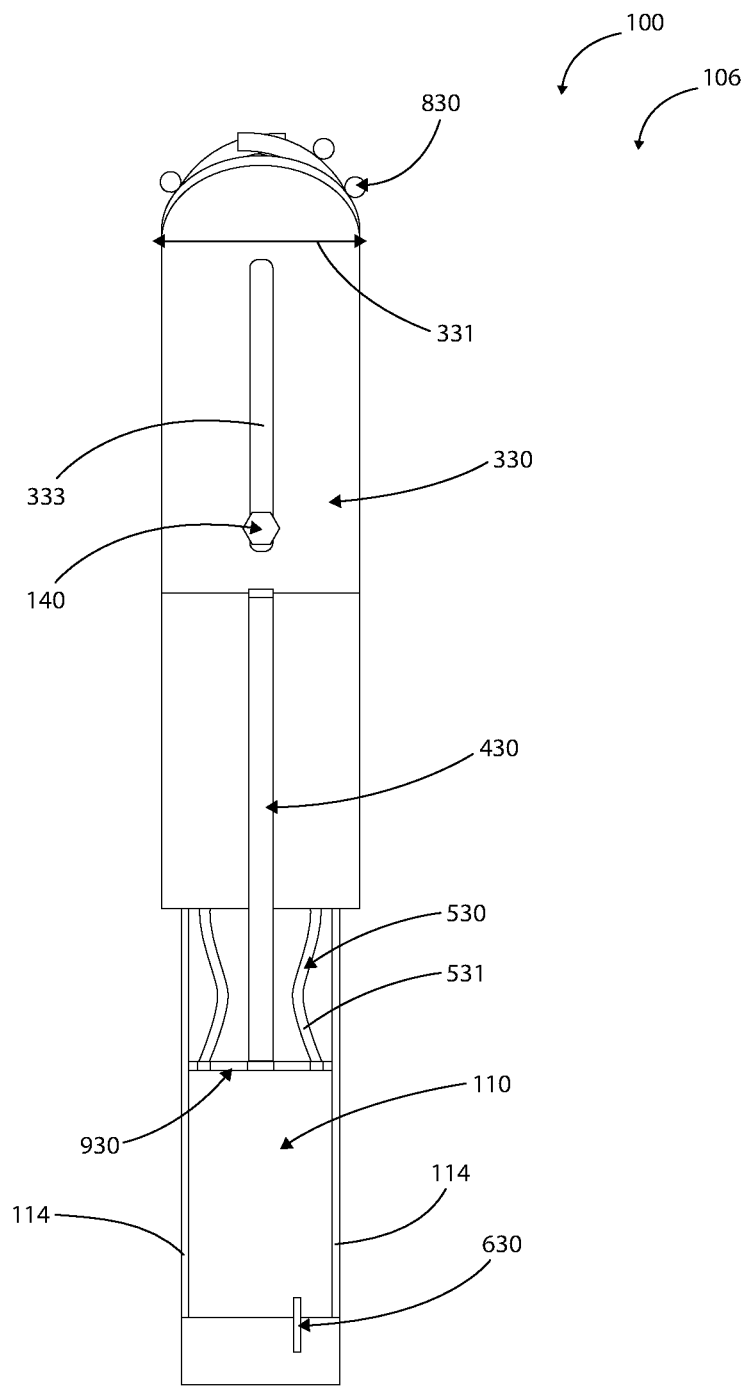
FIG. 7 is a top view of the apparatus, illustrating the apparatus in the unloaded position whereby a blade has been fired over the grabber head, according to an embodiment of the present disclosure.
Figure 8:
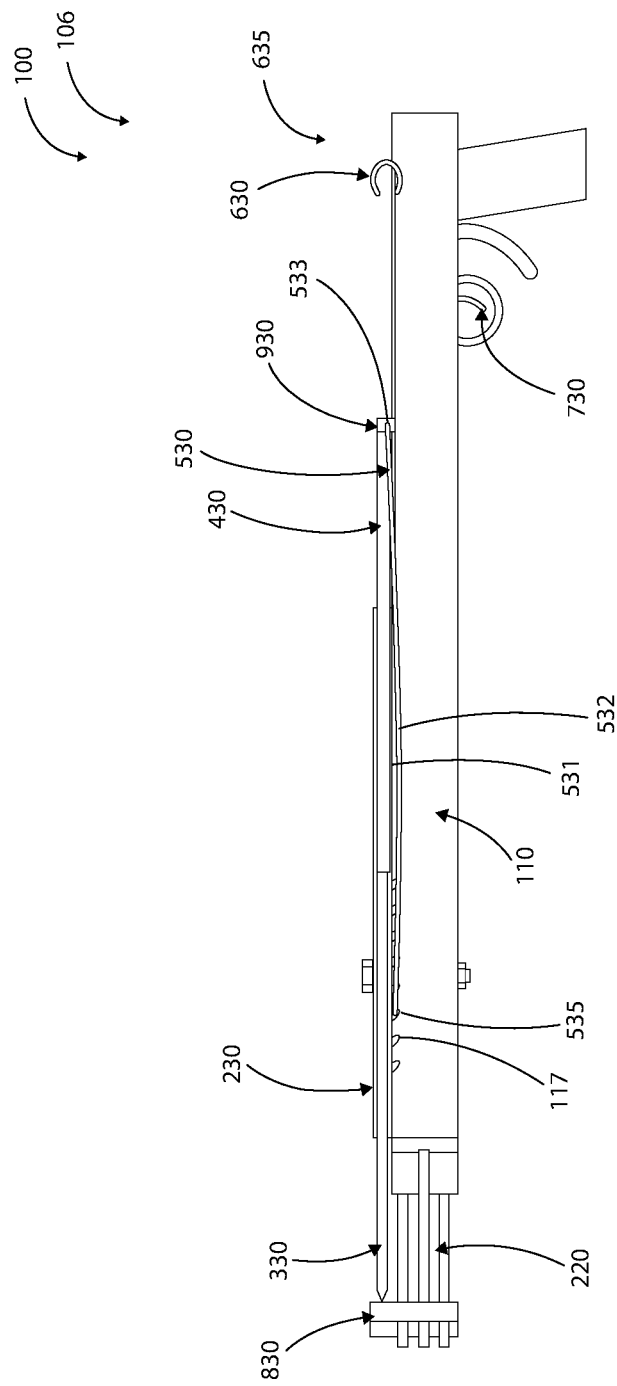
FIG. 8 is a side view of the apparatus, illustrating the apparatus in the unloaded position whereby the blade has been fired over the grabber head, according to an embodiment of the present disclosure.
Figure 9A:
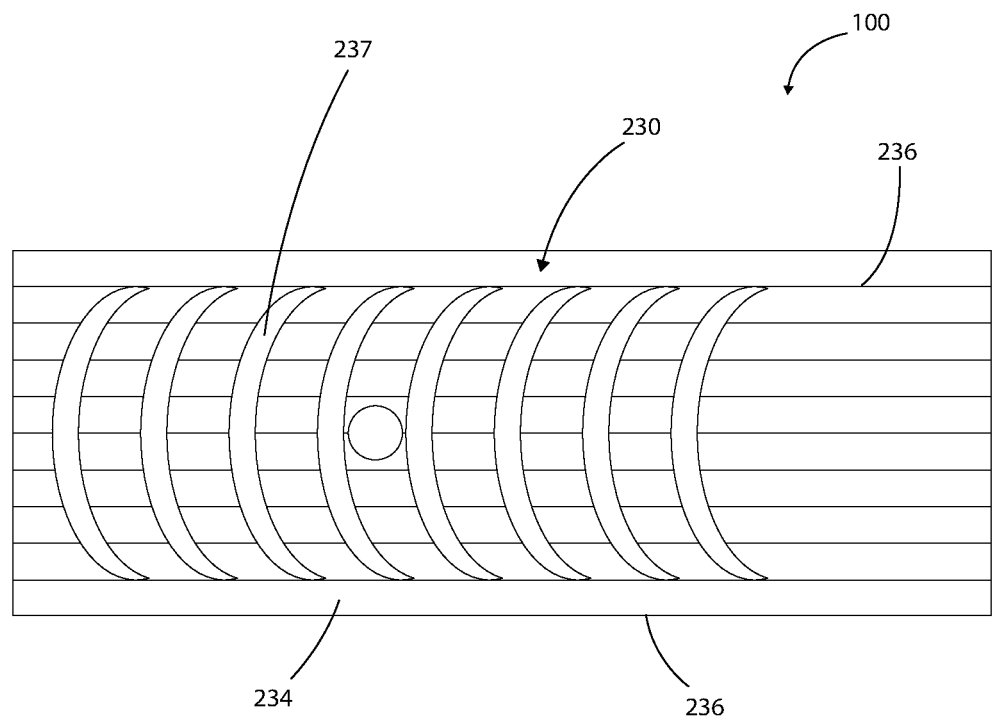
FIG. 9A is a top view of the apparatus, illustrating a bottom side of a housing, according to an embodiment of the present disclosure.
Figure 9B:
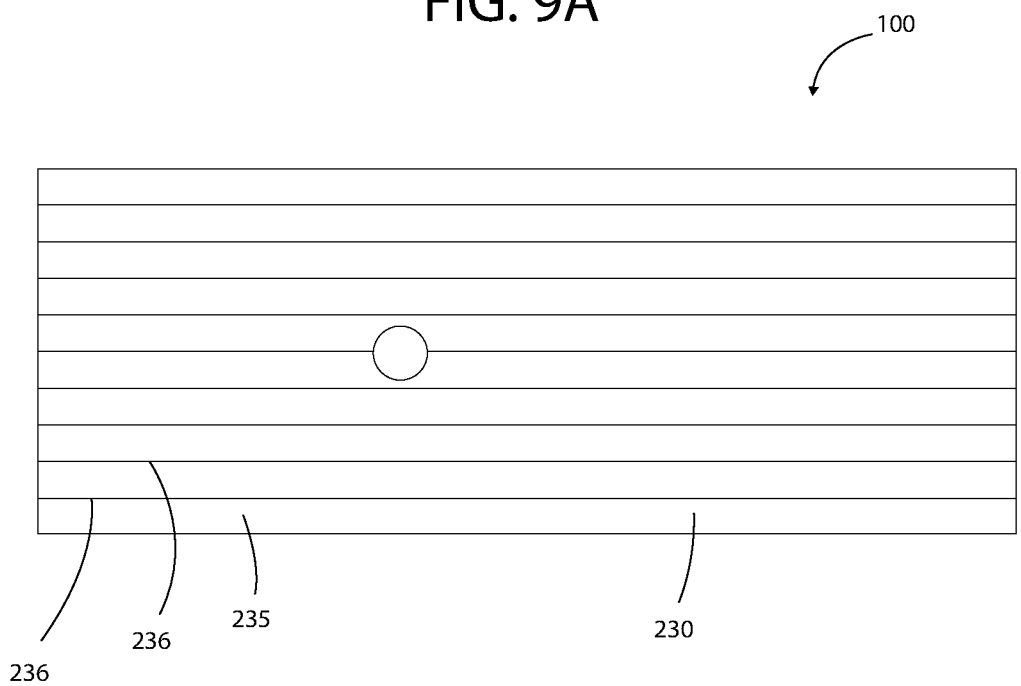
FIG. 9B is a top view of the apparatus, illustrating a top side of the housing, according to an embodiment of the present disclosure.

As shown in FIGS. 1-8, the killing assembly 130 may include a housing 230 attached to a top surface 118 of the main body 110. Preferably, at least a portion of the housing 230 may be removable from the main body 110. The housing 230 may include a bottom side 234 (FIG. 9A) and a top side 235 (FIG. 9B). The top side 235 may define a cover. The bottom side 234 and the top side 235 may both be selectively removable and attachable to and from the main body 110. For example, as shown, the housing 230 and the main body 110 may be selectively attached via a nut and bolt assembly 140. Other fastening means may be used.

Figure 6:
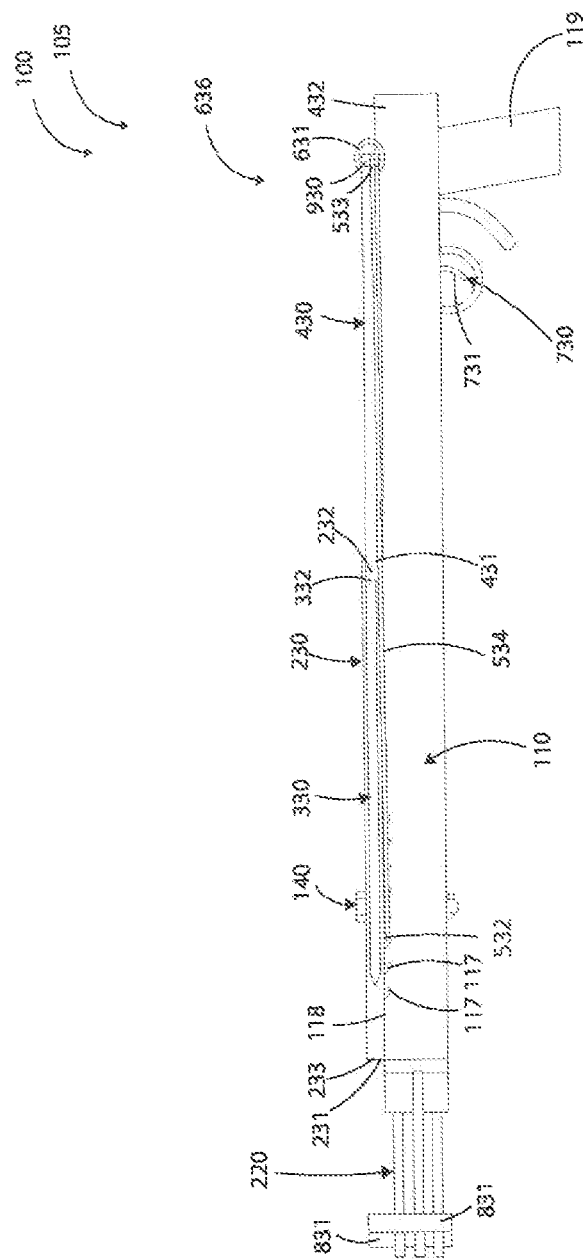
FIG. 6 is a side view of the apparatus, illustrating the apparatus in the loaded position, according to an embodiment of the present disclosure.

The housing 230 may include a first opening 231 opposite a second opening 232. The first opening 231 may be located about the grabber head 220 and may define a blade-exit 233. As shown, the blade 330 may be (removably) located within the housing 230 and configured for (selective) movement out of the blade-exit 233. Preferably, as shown in FIGS. 4, 6 and 8, the housing 230 may include a low-profile. This may prevent the apparatus 100 from being too cumbersome and bulky and also may stabilize the blade 330 during movement. The blade 330 may be entirely (or substantially) housed within the housing 230 at all times during a stored condition and may only exit the housing 230 (via the blade-exit 233) when killing. Further, as shown in FIGS. 9A-9B, in some embodiments, an inner surface of the bottom side 234 and the top side 235 of the housing 230 may include raised ribs 236. The raised ribs 236 may provide a stable level surface for the blade 330 to travel along without causing excessive friction to the blade 330.

Figure 5:
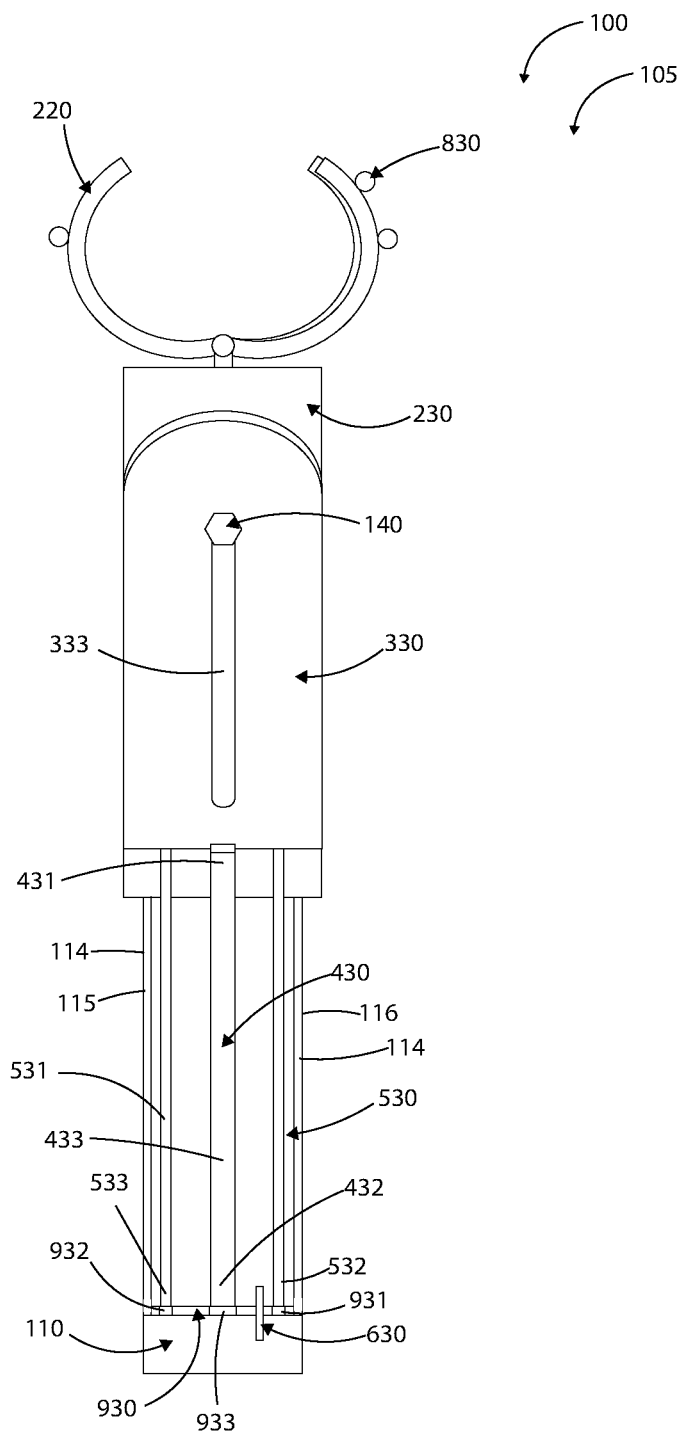
FIG. 5 is a top view of the apparatus, illustrating the apparatus in a loaded (ready to fire) position, according to an embodiment of the present disclosure.

Preferably, the blade 330 may be removable from the housing 230, and thus, removable from the apparatus 110. This may allow the user to selectively sharpen the blade 330, ensuring the blade 330 is sharp enough to decapitate the poultry effectively and humanely. In this embodiment, the blade 330 may also be attached to the housing 230 and the main body 110 via the same nut and bolt assembly 140. A rod 430 may be provided in the killing assembly 130. As shown in FIG. 5 specifically, the rod 430 may include a first rod-end 431 opposite a second rod-end 432 and a rod-length 433 therebetween.

Figure 3:
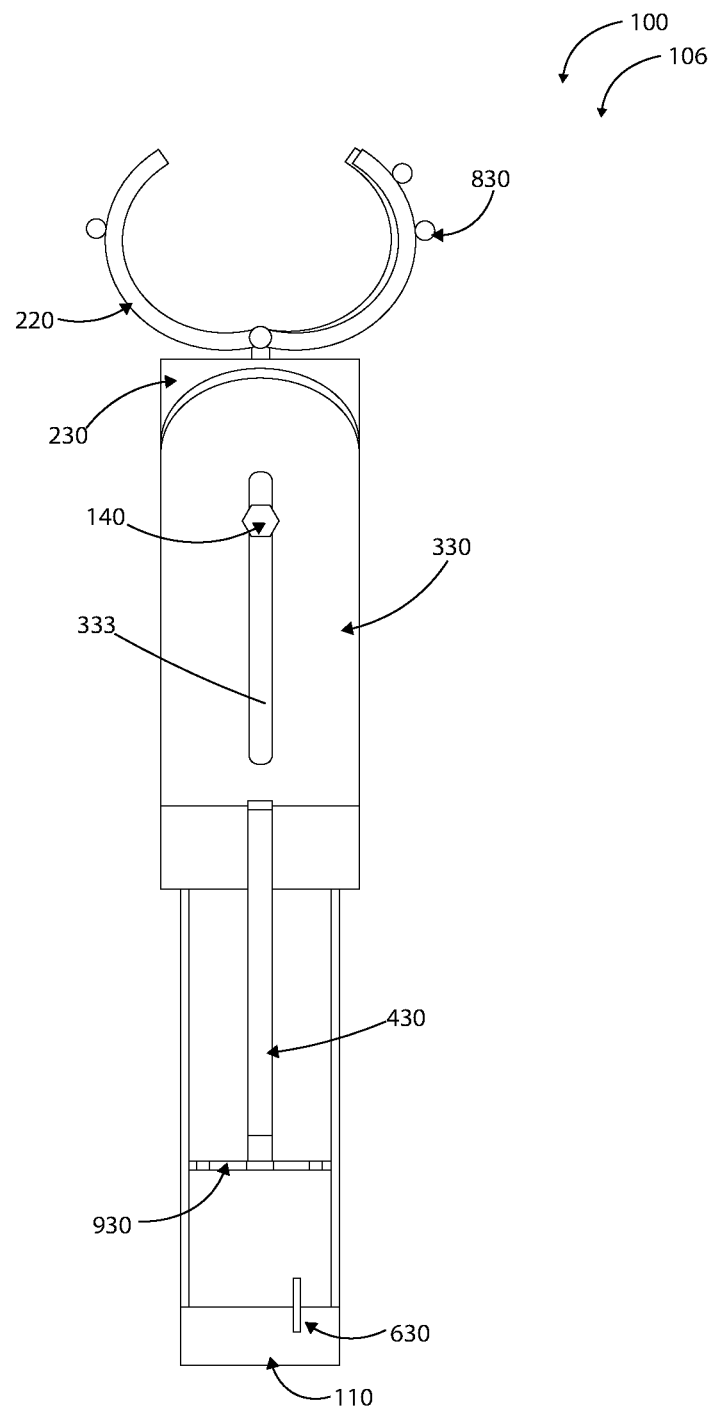
FIG. 3 is a top view of the apparatus, illustrating the apparatus in an unloaded position, according to an embodiment of the present disclosure.

The first rod-end 431 may be attached to a rear-side 332 of the blade 330. The rod 430 may be attached to the blade 330 via removable means, semi-permanent means, or permanent means. For example, in some embodiments, the rod 430 may be welded to the blade 330. Further, as shown in FIGS. 3, 5 and 7, the blade 330 may include a blade-track 333 in which the bolt from the nut and bolt assembly 140 is threaded through. This may allow the blade 330 to move along the blade-track 333 relative to the rod 430.

The rod 430 may be configured for selective placement between a loaded position 105 and an unloaded position 106. An at least one tensioning means 530 may be configured to selectively place the rod 430 in tension, biasing the rod 430 in a forward direction and thereby placing the rod 430 in the loaded position 105. Preferably, as shown in FIGS. 5-8, the at least one tensioning means 530 may include at least one elasticated band 531. In some embodiments, the elasticated band 531 may be elongated tubing having a first tube-end 532 opposite a second tube-end 533 and a tube-length 534 therebetween. The at least one elasticated band 531 may be high strength to provide a high level of tension to the rod 430.

As shown in FIGS. 3-8, a horizontal bar 930 may be attached to the main body 110. The horizontal bar 930 may be slidable there along to move the rod 430 between the loaded position 105 and the unloaded position 106. In this embodiment, the main body 110 may further include a bar-track 114 on the left side 115 and the right side 116 thereof, and each end of the horizontal bar 930 may be slidably mounted within the bar-track 114. As shown in FIG. 8, a mid-section 535 of the elasticated band 531 may be configured for removable attachment about one of the main body 110 and the housing 230, and the first tube-end 532 and the second tube-end 533 of the elasticated band 531 may both be configured for removable attachment to the horizontal bar 930.

Preferably, as shown in FIG. 8, the mid-section 535 of the elasticated band 531 may be configured for removable attachment to the main body 110, between the main body 110 and the housing 230. Preferably, the main body 110 may include a plurality of first band attachers 117. Each first band attacher of the plurality of first band attachers 117 may be configured to attach the mid-section 535 of the elasticated band 531 thereto. The horizontal bar 930 may preferably include a second band attacher 931 configured to removably attach the first tube-end 532 of the elasticated band 531 thereto, and a third band attacher 932 configured to removably attach the second tube-end 533 thereto. Further, the horizontal bar 930 may include a rod attacher 933 configured to removably attach the second rod-end 432 thereto. In some embodiments, the second band attacher 931, the third band attacher 932 and the rod attacher 933 may be clips, however other attachment means may also be contemplated.

Preferably, each first band attacher 117 may provide a different level of tension. For example, if the mid-section 535 of the elasticated band 531 is attached to a first band attacher 117 that is far away from the horizontal bar 930, the elasticated band 531 must be stretched further to reach the horizontal bar 930, and therefore more tension is built into the elasticated band 531 (and consequently, the rod 430). This high tension may be used for larger poultry having stronger necks, such as geese. Conversely, if the mid-section 535 of the elasticated band 531 is attached to a first band attacher 117 that is close to the horizontal bar 430, the elasticated band 531 need not be stretched as much and therefore there is less tension in the elasticated band 531 and rod 430. This may be used for smaller poultry, such as chicks (infirm).

To aid in adjustability of the tension, the killing assembly 130 may be configured for use with more than one elasticated band 531. More than one elasticated band 531 may be needed depending on species of bird, strength of elasticated bands, etc. Preferably, the elasticated band(s) 531 may be completely removable from the apparatus 100. This may allow the user to interchange the elasticated band(s) 531, interchanging different lengths, strengths, band thickness, etc.

As shown specifically in FIG. 4, in some embodiments, the plurality of first band attachers 117 may include a plurality of grooves recessed through a top surface 118 of the main body 110. The mid-section 535 of the elasticated band 531 may be placed into one of the grooves. Further, as shown in FIG. 9A, the bottom side 234 of the housing 230 may include a plurality of cutouts 237 each corresponding to a groove in the main body 110, so that when the mid-section 535 of the elasticated band 531 is placed within one of the grooves, the main body 110 and the housing 230 are flush.

As shown in FIGS. 1-8, a holder means 630 may be provided and configured to hold the rod 430 in the loaded position 105 so that the rod 430 is not fired before the user is ready. Preferably, the holder means 630 may be configured to receive and lock the horizontal bar 930 therewithin. For example, in some embodiments, the holder means 630 may include a clip 631 configured to selectively encircle the horizontal bar 930. The clip 631 may include a first clip half and a second clip half movable between an unclipped position 635 and a clipped position 636 and defining an aperture 634 therethrough. As such, the horizontal bar 930 may be inserted into the aperture 634, and the first clip half and the second clip half may encircle the horizontal bar 930 when in the clipped position 636.

As shown in FIGS. 1, 4, 6, 8 a killing-trigger 730 may be in communication with the holder means 630. Actuation of the killing-trigger 730 when the rod 430 is in the loaded position 105 may forcefully spring the rod 430 in the forward direction, moving the blade 330 from the blade-exit 233 and over the grabber head 220, thereby decapitating the poultry being grasped at the neck by the grabber head 220. Preferably, the killing-trigger 730 may be configured to unlock the horizontal bar 930 from the holder means 630, thereby allowing the tension built up in the rod 430 to spring the rod 430 forward.

In some embodiments, as shown specifically in FIG. 6, the killing trigger 730 may include a lever 731. Further, at least one spring (not illustrated) may be in communication with the holder means 630 and the killing trigger 730. The at least one spring may be in communication with the first clip half and the second clip half and configured to bias the clip 631 in one of the unclipped position 635 or the clipped position 636. For example, the clip 631 may be biased in the clipped position 636. In this example, pressing on the lever 731 may overcome the bias to place the clip 631 in the unclipped position 636, thereby letting go of the horizontal bar 930 and springing the rod 430 (and blade 330) forward. Once the user lets go of the lever 731, the clip 631 may spring back into the clipped position 636. This bias towards the clipped position 636 may also prevent accidental firing of the rod 430 and blade 330. Further, to aid in prevention of accidental firing, the killing-trigger 730 may include a safety housing therearound.

In one example, the user may attach the mid-section 535 of the elasticated band 531 (or more than one elasticated band 531) to one of the first band attachers 117. This may be achieved by removing the top side 235 of the housing 230 (the cover) and the blade 330 to expose the plurality of first band attachers 117. Once the mid-section 535 of the elasticated band 531 is attached, the user may place the blade 330 thereover and place the cover over the blade, fastening everything together with the nut and bolt assembly 140.

The user may then attach the first tube-end 532 of the elasticated band 531 to the second band attacher 931, the second tube-end 533 of the elasticated band 531 to the third band attacher 932, and the second rod-end 432 of the rod 430 to the rod attacher 933. The user may then pull the horizontal bar 930, sliding it along the bar-track 114 in the main body 110 to about the second body-end 112 of the main body 110, thus stretching the elasticated band(s) 531 and placing the rod 430 under tension. The user may then attach the horizontal bar 930 to the holder means 630, holding the rod 430 in the loaded position 105. Once the user is ready to kill the poultry, they may utilize the killing-trigger 730 to cause the holder means 630 to release the horizontal bar 930, springing the rod 430 forward via the built up tension, and thus springing the blade 330 over the grabber head 220 and decapitating the poultry.

It should be appreciated that the at least one tensioning means 530 is not limited to the (at least one) elasticated band 531. For example, in some embodiments, spring(s) may be included in the killing assembly 130 (not illustrated). The spring(s) may selectively bias the rod 430 towards the forward direction and the holder means 630 may overcome the bias, holding and preventing movement of the rod 430. Once the rod 430 released the spring bias may fire the rod 430 (and blade 330) over the grabber head 220.

As shown in FIG. 7, the blade 330 may include a width 331 larger than a width 225 of the grabber head 220 when in the grasping position 104. This may ensure that the poultry is completely decapitated and there is no chance of failure. Further, as shown in FIGS. 1-8, a stopper means 830 may be attached to at least one of the first grabber finger 221 and the second grabber finger, and in some embodiments, the third grabber finger 223. The stopper means 830 may be configured to stop movement of the blade 330. Due to the forceful movement of the rod 430 (and therefore the blade 430) when fired, without the stopper means 830 the blade 330 and rod 430 would be ejected from the apparatus 100. The stopper means 830 therefore stops complete exit of the blade 330 from the apparatus 100 whilst still providing some tension and stability to ensure clean and complete decapitation.

In some embodiments, the stopper means 830 may include a set of pins 831. The set of pins 831 may include three pins and each pin may be attached to one of the first grabber finger 221, the second grabber finger 222, and the third grabber finger 223. It should however be appreciated that other stopper means 830 are contemplated. Further, as above, the blade 330 may include a blade-track 333 with the bolt from the nut and bolt assembly 140 threaded therethrough. The bolt may also act as a safety stop feature, in the event that the stopper means 830 fails. For example, if the blade 330 is not stopped by the stopper means 830, the blade 330 will be stopped once an end of the blade-track 333 reaches the bolt.

Figure 10:
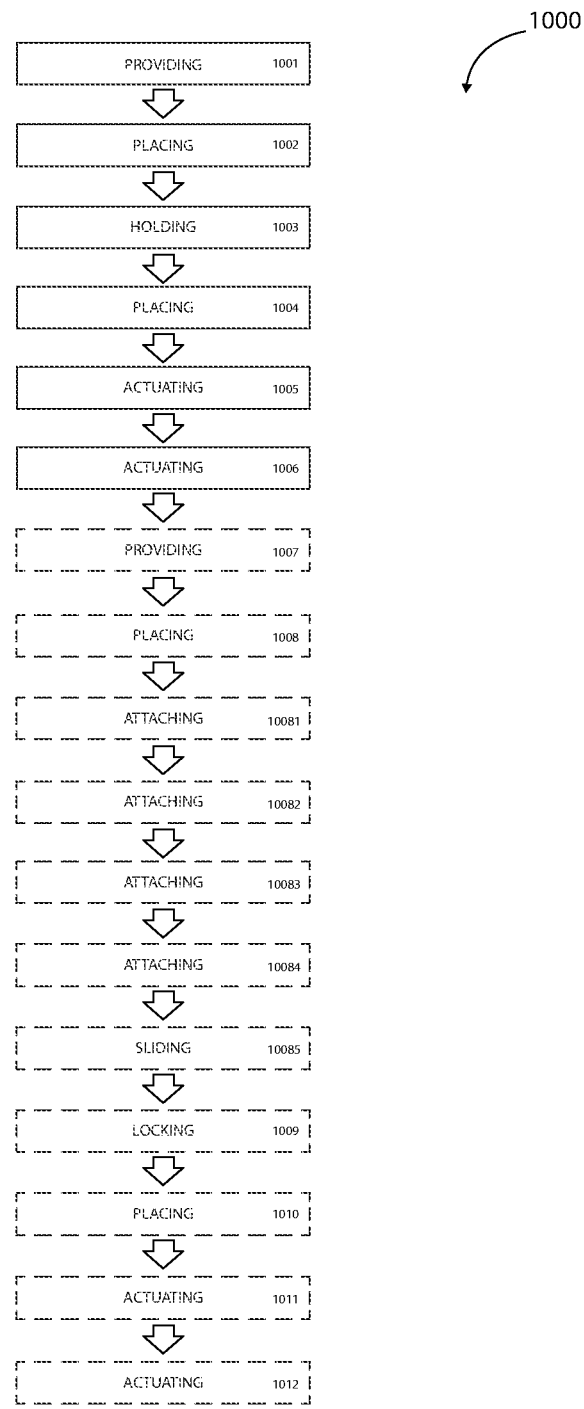
FIG. 10 is a flow diagram illustrating a method of using an apparatus for killing poultry, according to an embodiment of the present disclosure.

Referring now to FIG. 10 showing a flow diagram illustrating a method 1000 of using an apparatus for killing poultry, according to an embodiment of the present disclosure. In particular, the method 1000 may include one or more components or features of the apparatus 100 as described above. As illustrated, the method 1000 may include the steps of: step one 1001, providing the apparatus; step two 1002, placing the rod into the loaded position via the at least one tensioning means; step three 1003, holding the rod in the loaded position via the holder means; step four 1004, placing the grabber head around the neck of the poultry in the open position; step five 1005, actuating the grabber actuator assembly to move the grabber head into the grasping position, thereby grasping the neck of the poultry; and step six 1006, actuating the killing-trigger, thereby forcefully springing the rod in the forward direction and moving the blade from the blade-exit and over the grabber head, thereby decapitating the poultry being grasped at the neck by the grabber head.

Further steps may include: step seven 1007, providing the apparatus whereby the apparatus includes the main body further including the bar-track on the left side and the right side thereof, and the plurality of first band attachers spanning the elongated-body length; a horizontal bar attached to the main body, each end of the horizontal bar being slidably mounted within the bar-track of the main-body, the horizontal bar including a second band attacher, a third band attacher and a rod attacher, the rod attacher configured to removably attach the second rod-end thereto; the at least one tensioning means including at least one elasticated band being elongated tubing having a first tube-end opposite a second tube-end and a tube-length therebetween, a midsection of the elasticated band being configured for attachment to one of the first band attachers, the first tube-end being configured for attachment to the second band attacher, the second tube-end being configured for attachment to third band attacher; the holder means being configured to receive and lock the horizontal bar therewithin; the killing-trigger being configured to unlock the second rod-end of the rod from the holder means.

Step eight 1008 may comprise, placing the rod into the loaded position via the at least one tensioning means by: attaching 10081 the mid-section of the elasticated band to one of the first band attachers; attaching 10082 the first tube-end to the second attacher on the horizontal bar; attaching 10083 the second tube-end to the third attacher on the horizontal bar; attaching 10084 the second rod-end to the rod attacher on the horizontal bar; and sliding 10085 the horizontal bar to about the second body-end of the main body, stretching the elasticated band and placing the rod in the loaded position; step nine 1009, locking the horizontal bar in the holder means; step ten 1010, placing the grabber head around the neck of the poultry in the open position; step eleven 1011, actuating the grabber actuator assembly to move the grabber head into the grasping position, thereby grasping the neck of the poultry; and step twelve 1012, actuating the killing-trigger, thereby forcefully springing the rod in the forward direction and moving the blade from the blade-exit and over the grabber head, thereby decapitating the poultry being grasped at the neck by the grabber head.

It should be noted that certain steps may be optional and may not be implemented in all cases. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using an apparatus to kill poultry are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for at least one of grasping and killing poultry, the apparatus comprising:
    a main body including a first body-end opposite a second body-end and an elongated-body length therebetween;
    a grabber assembly including:
        a grabber head located at the first body-end of the main body, the grabber head including at least a first grabber finger and a second grabber finger defining an opening therebetween, the first grabber finger and the second grabber finger pivotally connected together such that movement of the first grabber finger and the second grabber finger relative to each other allows for selective movement of the grabber head between an open position and a grasping position, the opening being smaller in the grasping position than in the open position, and wherein the opening is sized to hold at least one of a leg and a neck of the poultry when in the grasping position; and
        an actuator assembly being configured to move the first grabber finger and the second grabber finger between the open position and the grasping position;
    a killing assembly including:
        a housing attached to a top surface of the main body, the housing including a first opening opposite a second opening, the first opening being located about the grabber head and defining a blade-exit;
        a blade removably located within the housing and configured for selective movement out of the blade-exit;
        a rod including a first rod-end opposite a second rod-end and a rod-length therebetween, the first rod-end attached to a rear-side of the blade, the rod being configured for selective placement between a loaded position and an unloaded position;
        at least one tensioning means configured to selectively place the rod in tension, biasing the rod in a forward direction and thereby placing the rod in the loaded position;
        a holder means configured to hold the rod in the loaded position;

a killing-trigger in communication with the holder means, wherein actuation of the killing-trigger when the rod is in the loaded position forcefully springs the rod in the forward direction, moving the blade from the blade-exit and over the grabber head, thereby decapitating the poultry being grasped at the neck by the grabber head; and a stopper means attached to at least one of the first grabber finger and the second grabber finger, the stopper means being configured to stop movement of the blade.

2. The apparatus of claim 1, wherein the grabber head further includes a third grabber finger.

3. The apparatus of claim 1, wherein the at least one tensioning means includes at least one elasticated band.

4. The apparatus of claim 3, wherein the at least one elasticated band is elongated tubing having a first tube-end opposite a second tube-end and a tube-length therebetween.

5. The apparatus of claim 4, further comprising a horizontal bar attached to the main body, the horizontal bar being slidable there along to move the rod between the loaded position and the unloaded position.

6. The apparatus of claim 5, wherein the main body further include a bar-track on a left side and a right side thereof, and wherein each end of the horizontal bar is slidably mounted within the bar-track.

7. The apparatus of claim 6, wherein a mid-section of the elasticated band is configured for removable attachment about one of the main body and the housing, and the first tube-end and the second tube-end elasticated are both configured for removable attachment to the horizontal bar.

8. The apparatus of claim 7, wherein the main body includes a plurality of first band attachers, each said first band attacher of the plurality of first band attachers being configured to attach the mid-section of the elasticated band thereto, and wherein each said first band attacher provides a different level of tension.

9. The apparatus of claim 8, wherein the plurality of first band attachers include a plurality of grooves recessed through a top surface of the main body.

10. The apparatus of claim 9, wherein the horizontal bar includes a second band attacher configured to removably attach the first tube-end of the elasticated band thereto, and a third band attacher is configured to removably attach the second tube-end thereto.

11. The apparatus of claim 10, wherein the horizontal bar further includes a rod attacher configured to removably attach the second rod-end thereto.

12. The apparatus of claim 11, wherein the holder means is configured to receive and lock the horizontal bar therewithin.

13. The apparatus of claim 12, wherein the holder means includes a clip configured to selectively encircle the horizontal bar.

14. The apparatus of claim 13, wherein the killing-trigger is configured to unlock the horizontal bar from the holder means thereby allowing the tension built up in the rod to spring the rod forward.

15. The apparatus of claim 1, wherein the blade includes a width larger than a width of the grabber head when in the grasping position.

16. An apparatus for at least one of grasping and killing poultry, the apparatus comprising:

a main body including a first body-end opposite a second body-end and an elongated-body length therebetween, a bar-track on a left side and a right side thereof, and a plurality of first band attachers spanning the elongated-body length;

a grabber assembly including:
  a grabber head located at the first body-end of the main body, the grabber head including at least a first grabber finger and a second grabber finger defining an opening therebetween, the first grabber finger and the second grabber finger pivotally connected together such that movement of the first grabber finger and the second grabber finger relative to each other selectively allows movement of the grabber head between an open position and a grasping position, the opening being smaller in the grasping position than in the open position, and wherein the opening is sized to hold at least one of a leg and neck of the poultry when in the grasping position; and
  an actuator assembly being configured to move the first grabber finger and the second grabber finger between the open position and the grasping position;

a killing assembly including:
  a housing attached to a top surface of the main body, the housing including a first opening opposite a second opening, the first opening being located about the grabber head and defining a blade-exit;
  a blade removably located within the housing and configured for selective movement out of the blade-exit, the blade including a width larger than a width of the grabber head when in the grasping position;
  a rod including a first rod-end opposite a second rod-end and a rod-length therebetween, the first rod-end attached to a rear-side of the blade, the rod being configured for selective placement between a loaded position and an unloaded position;
  a horizontal bar attached to the main body, each end of the horizontal bar being slidably mounted within the bar-track of the main-body, the horizontal bar including a second band attacher, a third band attacher and a rod attacher, the rod attacher configured to removably attach the second rod-end thereto;
  at least one tensioning means configured to selectively place the rod in tension, biasing the rod in a forward direction and thereby placing the rod in the loaded position, the at least one tensioning means including at least one elasticated band being elongated tubing having a first tube-end opposite a second tube-end and a tube-length therebetween, a mid-section of the elasticated band being configured for attachment to one of the first band attachers, the first tube-end being configured for attachment to the second band attacher, the second tube-end being configured for attachment to third band attacher;
  a holder means configured to hold the rod in the loaded position, the holder means configured to receive and lock the horizontal bar therewithin;
  a killing-trigger in communication with the holder means, the killing-trigger configured to unlock the horizontal bar from the holder means, wherein actuation of the killing-trigger when the rod is in the loaded position forcefully springs the rod in the forward direction, moving the blade from the blade-exit and over the grabber head, thereby decapitating the poultry being grasped at the neck by the grabber head; and a stopper means attached to at least one of the first grabber finger and the second grabber finger, the stopper means being configured to stop movement of the blade.

17. The apparatus of claim 16, wherein the grabber head further includes a third grabber finger.

18. The apparatus of claim 16, wherein the holder means includes a clip configured to selectively encircle the horizontal bar.

19. A method of using an apparatus for killing poultry, the method comprising the steps of:
   providing the apparatus including:
      a main body including a first body-end opposite a second body-end and an elongated-body length therebetween;
      a grabber assembly including:
         a grabber head located at the first body-end of the main body, the grabber head including at least a first grabber finger and a second grabber finger defining an opening therebetween, the first grabber finger and the second grabber finger pivotally connected together such that movement of the first grabber finger and the second grabber finger relative to each other allows for selective movement of the grabber head between an open position and a grasping position, the opening being smaller in the grasping position than in the open position, and wherein the opening is sized to hold at least one of a leg and a neck of the poultry when in the grasping position; and
         an actuator assembly being configured to move the first grabber finger and the second grabber finger between the open position and the grasping position;
      a killing assembly including:
         a housing attached to a top surface of the main body, the housing including a first opening opposite a second opening, the first opening being located about the grabber head and defining a blade-exit;
         a blade removably located within the housing and configured for selective movement out of the blade-exit;
         a rod including a first rod-end opposite a second rod-end and a rod-length therebetween, the first rod-end attached to a rear-side of the blade, the rod being configured for selective placement between a loaded position and an unloaded position;
         at least one tensioning means configured to selectively place the rod in tension, biasing the rod in a forward direction and thereby placing the rod in the loaded position;
         a holder means configured to hold the rod in the loaded position;
         a killing-trigger in communication with the holder means, wherein actuation of the killing-trigger when the rod is in the loaded position forcefully springs the rod in the forward direction, moving the blade from the blade-exit and over the grabber head, thereby decapitating the poultry being grasped at the neck by the grabber head; and
         a stopper means attached to at least one of the first grabber finger and the second grabber finger, the stopper means being configured to stop movement of the blade;

placing the rod into the loaded position via the at least one tensioning means;
   holding the rod in the loaded position via the holder means;
   placing the grabber head around the neck of the poultry in the open position;
   actuating the grabber actuator assembly to move the grabber head into the grasping position, thereby grasping the neck of the poultry; and
   actuating the killing-trigger, thereby forcefully springing the rod in the forward direction and moving the blade from the blade-exit and over the grabber head, thereby decapitating the poultry being grasped at the neck by the grabber head.

20. The method of claim 19, further comprising the steps of:
   providing the apparatus further comprising:
      the main body further including a bar-track on a left side and a right side thereof, and a plurality of first band attachers spanning the elongated-body length;
      a horizontal bar attached to the main body, each end of the horizontal bar being slidably mounted within the bar-track of the main-body, the horizontal bar including a second band attacher, a third band attacher and a rod attacher, the rod attacher configured to removably attach the second rod-end thereto;
      the at least one tensioning means including at least one elasticated band being elongated tubing having a first tube-end opposite a second tube-end and a tube-length therebetween, a mid-section of the elasticated band being configured for attachment to one of the first band attachers, the first tube-end being configured for attachment to the second band attacher, the second tube-end being configured for attachment to third band attacher;
      the holder means being configured to receive and lock the horizontal bar therewithin; and
      the killing-trigger being configured to unlock the second rod-end of the rod from the holder means; and
   placing the rod into the loaded position via the at least one tensioning means by:
      attaching the mid-section of the elasticated band to one of the first band attachers;
      attaching the first tube-end to the second attacher on the horizontal bar;
      attaching the second tube-end to the third attacher on the horizontal bar;
      attaching the second rod-end to the rod attacher on the horizontal bar; and
      sliding the horizontal bar to about the second body-end of the main body, stretching the elasticated band and placing the rod in the loaded position; and
   locking the horizontal bar in the holder means;
   placing the grabber head around the neck of the poultry in the open position;
   actuating the grabber actuator assembly to move the grabber head into the grasping position, thereby grasping the neck of the poultry; and
   actuating the killing-trigger, thereby forcefully springing the rod in the forward direction and moving the blade from the blade-exit and over the grabber head, thereby decapitating the poultry being grasped at the neck by the grabber head.

* * * * *